United States Patent
Cullen et al.

(10) Patent No.: US 10,303,755 B2
(45) Date of Patent: May 28, 2019

(54) ENHANCED DOCUMENTATION VALIDATION

(71) Applicant: INTERNATIONAL BUSINESS MACHINES CORPORATION, Armonk, NY (US)

(72) Inventors: Nathan Cullen, Cork (IE); Paul B. French, Cork (IE); James Young, Cork (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 14/878,482

(22) Filed: Oct. 8, 2015

(65) Prior Publication Data

US 2016/0103811 A1    Apr. 14, 2016

(30) Foreign Application Priority Data

Oct. 10, 2014   (GB) .................................. 1417948.5

(51) Int. Cl.
*G06F 17/24* (2006.01)
*G06F 17/27* (2006.01)
*G06K 9/00* (2006.01)

(52) U.S. Cl.
CPC .......... *G06F 17/24* (2013.01); *G06F 17/2765* (2013.01); *G06K 9/00483* (2013.01)

(58) Field of Classification Search
CPC ................................ G06F 17/21; G06F 17/211
See application file for complete search history.

(56) References Cited

U.S. PATENT DOCUMENTS

| 7,127,675 | B1 | 10/2006 | Kates et al. | |
|---|---|---|---|---|
| 7,536,684 | B2 | 5/2009 | Patrizio et al. | |
| 8,312,368 | B2 | 11/2012 | Swamidass | |
| 2005/0223325 | A1* | 10/2005 | Naitou ................ | G06F 17/2247 715/255 |
| 2005/0240858 | A1* | 10/2005 | Croft ................... | G06F 17/2211 715/229 |
| 2007/0245339 | A1 | 10/2007 | Bauman et al. | |
| 2008/0195377 | A1* | 8/2008 | Kato ................... | G06F 17/2836 704/8 |

(Continued)

OTHER PUBLICATIONS

"Method and apparatus for the automatic update of Screenshot Images", dated Apr. 14, 2009, pp. 1-3.

*Primary Examiner* — Stephen S Hong
*Assistant Examiner* — Ahamed I Nazar
(74) *Attorney, Agent, or Firm* — Michael O'Keefe; Matthew M. Hulihan; Heslin Rothenberg Farley & Mesiti PC

(57) ABSTRACT

Updating a document relating to updates of a graphical user interface (GUI) is provided. An example method includes identifying one or more images in a screenshot of an existing graphical user interface (GUI) and in a screenshot of a new GUI modified from the existing GUI; extracting image text associated with one or more component images from the existing GUI and the new GUI; identifying, in the new GUI, text and image differences between the component images from the existing GUI and the new GUI; identifying, in a document, document text associated with the text and image differences; and modifying the associated document text according to the identified text and image differences.

20 Claims, 11 Drawing Sheets

(56) References Cited

U.S. PATENT DOCUMENTS

| | | | |
|---|---|---|---|
| 2008/0252932 A1* | 10/2008 | Baer | G06F 17/2288 358/400 |
| 2008/0310736 A1* | 12/2008 | Chattopadhyay | G06F 11/3692 382/218 |
| 2011/0099499 A1* | 4/2011 | Pnueli | G06F 8/38 715/771 |
| 2011/0197121 A1* | 8/2011 | Kletter | G06F 17/2211 715/234 |
| 2011/0231750 A1* | 9/2011 | Naito | G06Q 40/02 715/234 |
| 2013/0006603 A1* | 1/2013 | Zavatone | G06F 17/289 704/2 |
| 2013/0091491 A1 | 4/2013 | Koutyrine et al. | |
| 2013/0318083 A1 | 11/2013 | Han et al. | |
| 2014/0019937 A1* | 1/2014 | Clark | G06F 8/73 717/123 |
| 2014/0096027 A1* | 4/2014 | Ji | G06F 3/048 715/744 |
| 2014/0122054 A1* | 5/2014 | Takano | G06F 17/2809 704/2 |
| 2015/0149493 A1* | 5/2015 | Schoning | G06F 17/30386 707/758 |
| 2015/0339213 A1* | 11/2015 | Lee | G06F 11/3664 717/125 |

* cited by examiner

460

| Smart Image Textual Elements (STE) Data ||||  |
|---|---|---|---|---|
| Product Name | Smart Image Textual Element (STE) ||| Delta |
|  | STE_ID | Type | Label |  |
| ATDv1 | 420 | button | Submit | - |
| ATDv1 | 422 | menu | File | - |
| ATDv1 | 424 | field | Host Name | - |

| Document Textual Elements (DTE) Data |||||  |
|---|---|---|---|---|
| Document ID | Version | STE_ID | Text | Delta |
| ATD User Guide | V1.0 | 420 | Submit button | - |
| ATD User Guide | V1.0 | 422 | File toolbar | - |
| ATD User Guide | V1.0 | 424 | Host Name | - |

| Modified Smart Image Textual Element (STE) Data |||||
|---|---|---|---|---|
| Product Name | Smart Image Textual Element (STE) ||| Delta |
| | STE_ID | Type | Label | |
| ATDv1 | 420 | button | Save | Modified |
| ATDv1 | 422 | menu | File | Same |
| ATDv1 | 424 | field | Host Name | Same |
| ATDv1 | 426 | field | IP Address | NEW |

| Modified Document Textual Elements (DTE) Data |||||
|---|---|---|---|---|
| Document ID | Version | STE_ID | Text | Delta |
| ATD User Guide | V1.1 | 420 | Save button | Modified |
| ATD User Guide | V1.0 | 422 | File toolbar | - |
| ATD User Guide | V1.1 | 424 | Host Name | Unchanged |
| ATD User Guide | V1.1 | 426 | IP Address | NEW |

FIGURE 5C

ENHANCED DOCUMENTATION VALIDATION

PRIOR FOREIGN APPLICATION

This application claims priority from United Kingdom (GB) patent application number 1417948.5, filed Oct. 10, 2014, which is hereby incorporated herein by reference in its entirety.

BACKGROUND

This invention relates to enhanced document validation. Enhanced document validation relates to structured documentation systems, that is, systems that support documentation in software products. An information developer typically uses an automated documentation build system to document the user tasks and descriptions related to the software product, very often with embedded screenshots of the software product itself. However, this can cause problems when versions change frequently.

SUMMARY

Shortcomings of the prior art are overcome and additional advantages are provided through the provision of a computer system that includes a memory and a processing device in communications with the memory. The computer system is configured to perform a method that includes: identifying one or more images in a screenshot of an existing graphical user interface (GUI) and in a screenshot of a new GUI modified from the existing GUI; extracting image text associated with one or more component images from the existing GUI and the new GUI; identifying, in the new GUI, text and image differences between the component images from the existing GUI and the new GUI; identifying, in a document, document text associated with the text and image differences; and modifying the associated document text according to the identified text and image differences.

Further, a computer-implemented method is provided that includes identifying one or more images in a screenshot of an existing graphical user interface (GUI) and in a screenshot of a new GUI modified from the existing GUI; extracting image text associated with one or more component images from the existing GUI and the new GUI; identifying, in the new GUI, text and image differences between the component images from the existing GUI and the new GUI; identifying, in a document, document text associated with the text and image differences; and modifying the associated document text according to the identified text and image differences.

Yet further, a computer program product is provided, that includes a computer readable storage medium readable by a processor and storing instructions for execution by the processor for performing a method that includes: identifying one or more images in a screenshot of an existing graphical user interface (GUI) and in a screenshot of a new GUI modified from the existing GUI; extracting image text associated with one or more component images from the existing GUI and the new GUI; identifying, in the new GUI, text and image differences between the component images from the existing GUI and the new GUI; identifying, in a document, document text associated with the text and image differences; and modifying the associated document text according to the identified text and image differences.

Additional features and advantages are realized through the concepts of the present invention. Other embodiments and aspects of the invention are described in detail herein and are considered a part of the claimed invention.

BRIEF DESCRIPTION OF THE DRAWINGS

Embodiments of the present invention will now be described, by way of example only, with reference to the following drawings in which:

FIG. 4C is a schematic example of smart textual element data for the existing GUI, in accordance with aspects described herein;

FIG. 4D is a schematic example of document textual element data corresponding to the smart image textual element data for the existing GUI, in accordance with aspects described herein;

FIG. 5B is a schematic example of modified smart image textual element data for the modified GUI, in accordance with aspects described herein;

FIG. 5C is a schematic example of modified document textual element data, in accordance with aspects described herein;

DETAILED DESCRIPTION

As described previously, an information developer may use an automated documentation build system to document user tasks and descriptions related to a software product, often with embedded screenshots of the software product itself. For such build systems, it is desired that a screenshot in the document be the same as the software product itself, but this is problematic when versions change frequently.

For instance, screenshots can change with upgrades to a software application and so the documentation and screen shots can become out of date. Some approaches embed macros into the documentation system that includes the steps to get to the point of the application, capture the screenshot, and embed it into the documentation system. In this way, the most up-to-date screen shots are in the document.

Figure 1:
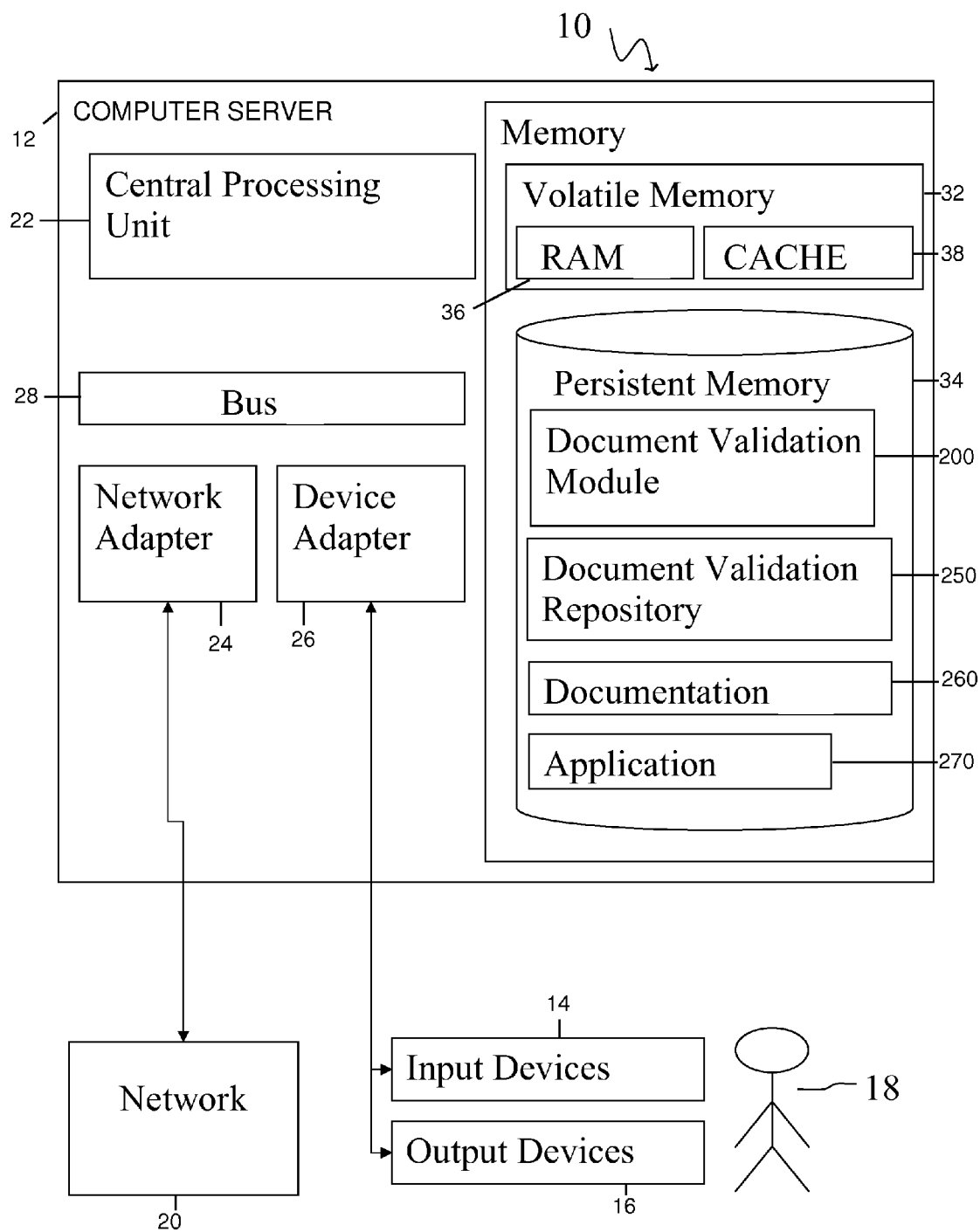
FIG. 1 is an example deployment diagram, in accordance with aspects described herein.

Referring to FIG. 1, an example deployment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 include random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: document validation module 200; document validation repository 250; documentation 260 and application 270. Further program modules that support the preferred embodiment but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Document validation module 200 analyses application 270 and documentation 260 and saves resulting new documentation and related data in document validation repository 250.

Figure 2A:
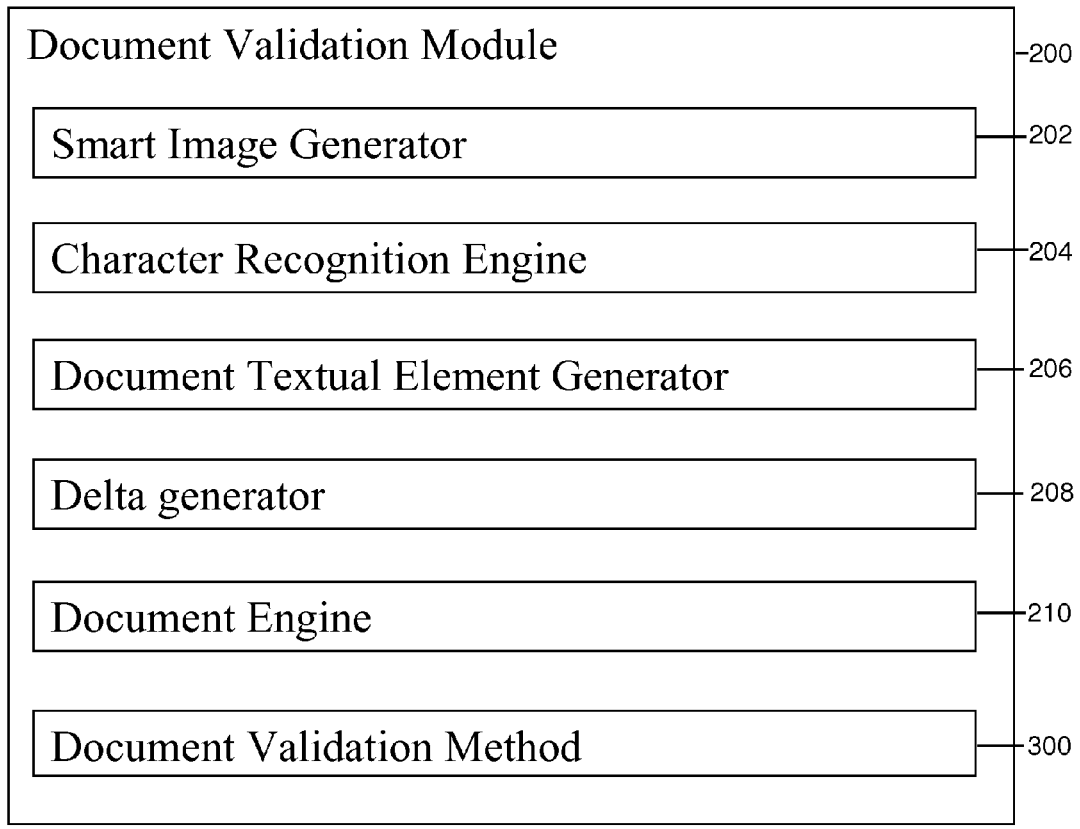
FIGS. 2A and 2B are example component diagrams, in accordance with aspects described herein.
Figure 2B:
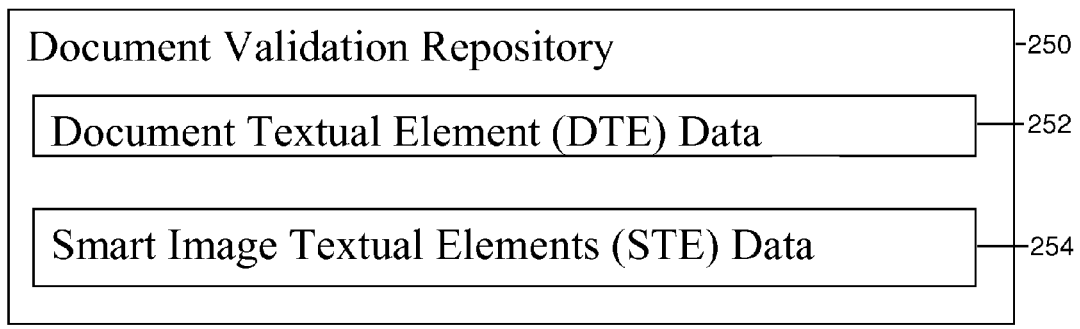

FIGS. 2A and 2B are example component diagrams, in accordance with aspects described herein. Referring to FIG. 2A, document validation module 200 comprises the following components: a smart image generator 202; a character recognition engine 204; a document textual element generator 206; a delta generator 208; a document engine 210; and document validation method 300.

Smart image generator 202 is for identifying one or more component images in a snapshot of the graphical user interface (GUI) and in a snapshot of a new GUI modified from the GUI. Smart image generator also tags the image with the recognized text data. A new GUI may also be generated from application 270 using a script associated with the GUI.

Character recognition engine 204 is for extracting image text associated with one or more images from the existing GUI and the new GUI.

Document textual element generator 206 is for generating document textual elements.

Delta generator 208 is for identifying image text modifications in the new GUI and for identifying, in the document, document text associated with the modified image text. Also, delta generator 208 is for comparing image textual elements and document textual elements from existing and modified graphical user interfaces for differences.

Document engine 210 is for modifying the document text that relates to the modified image text. Document engine 210 uses the differences in the textual elements to make and propose additions and other modifications for an existing documentation to bring in line for the modified GUI. Document engine 210 is optionally for creating a new document to be modified by copying the document.

Document validation method 300 controls the document validation module 200 in order to perform the embodiment.

Referring to FIG. 2B, document validation repository 250 comprises document text element (DTE) data 252 and smart image text elements (STE) data 254.

Figure 3A:
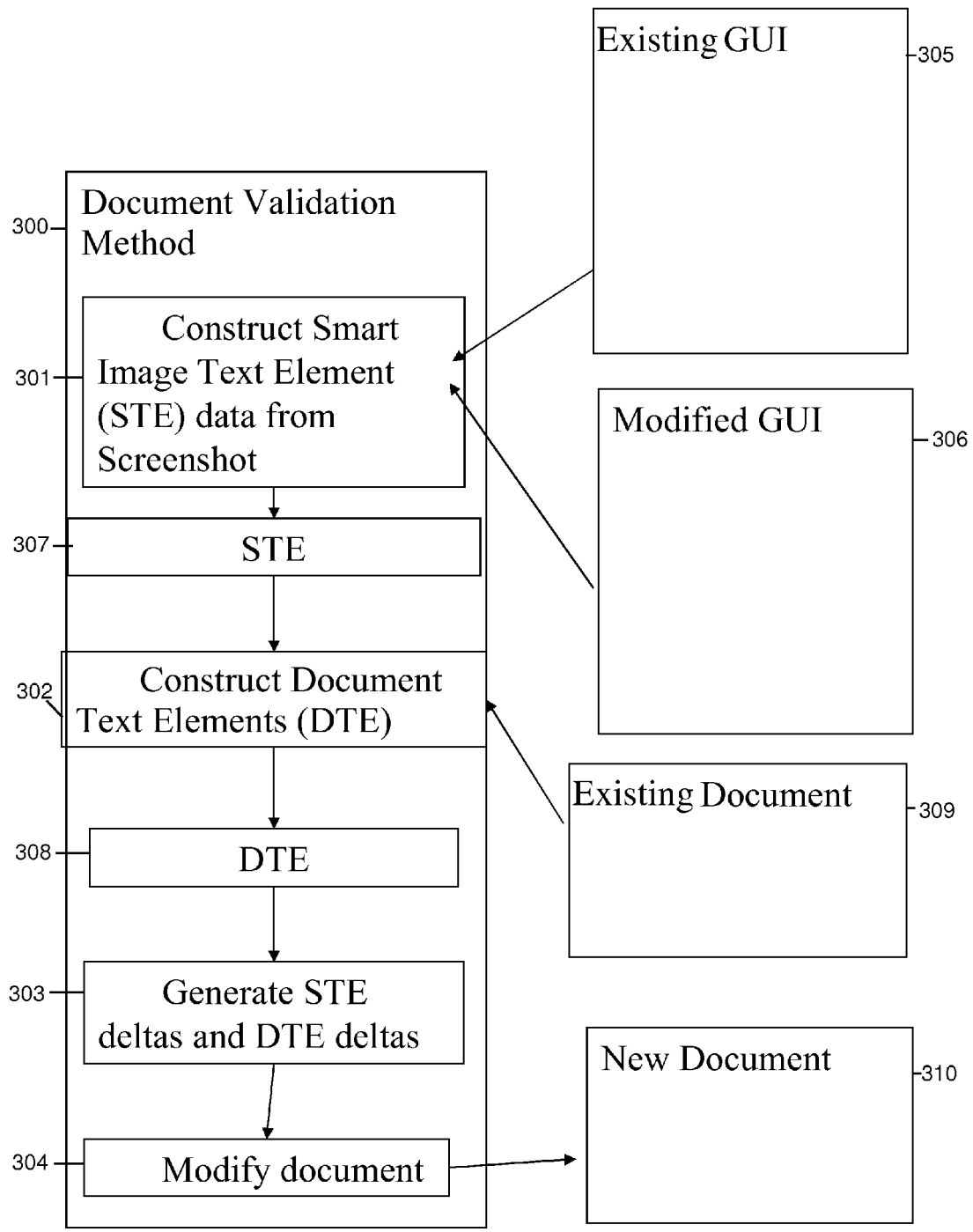
FIGS. 3A to 3D are example flow diagrams of example processes, in accordance with aspects described herein.

FIGS. 3A to 3D are example flow diagrams of example processes, in accordance with aspects described herein. Referring to FIG. 3A, method 300 comprises processing including:
- 301 is for identifying one or more image components in a snapshot of the existing graphical user interface (GUI) 305 and in a new GUI 306 modified from the GUI 305; for extracting image text associated with one or more images from the existing GUI 305 and the new GUI 306; and for constructing smart image text element (STE) data 307.
- 302 is for constructing document text element (DTE) data 308 for the respective existing GUI 305 and modified GUI 306.
- 303 is for identifying, in new GUI 306, image and text differences from the GUI 305 by examining STE 307 and DTE 308 deltas.
- 304 is for identifying, in the existing document 309, document text associated with the image and text differences; for modifying the document text that relates to the image and text differences; and creating a new document 310.

Figure 3B:
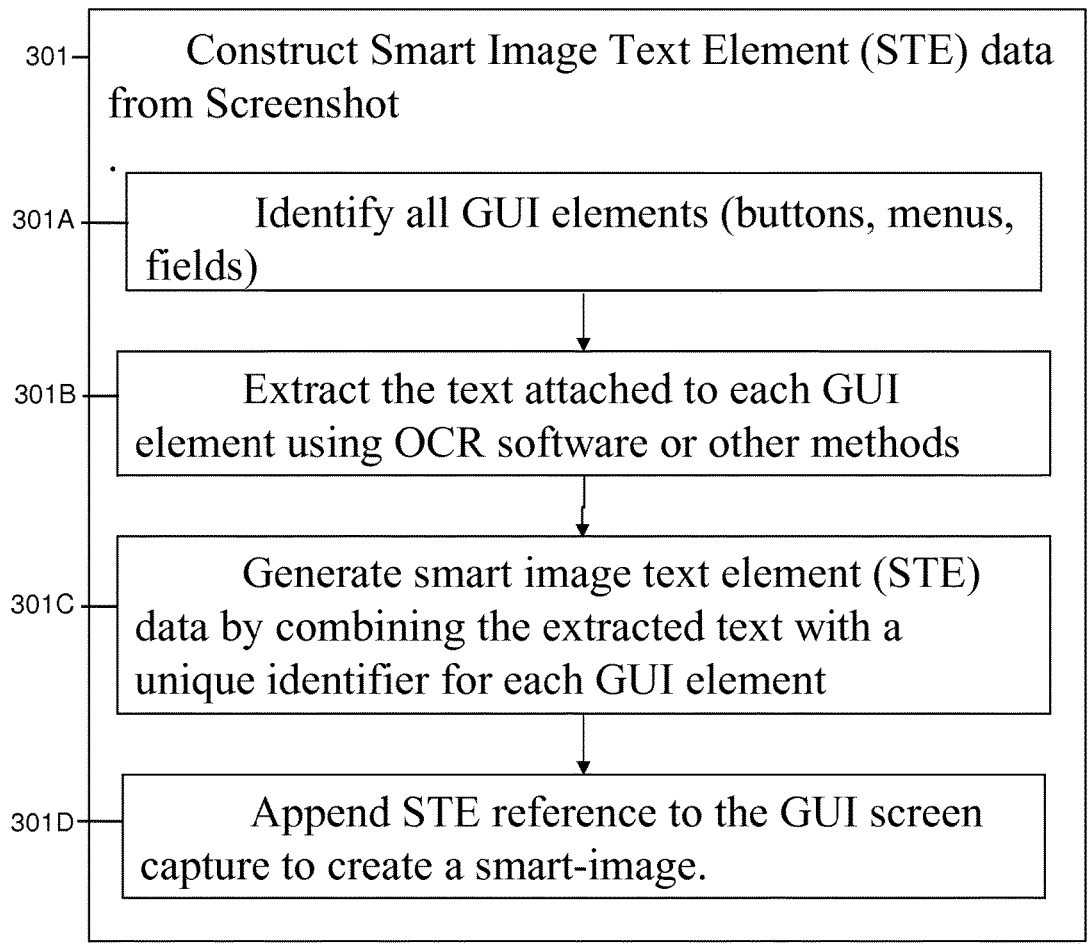

For example, consider that an original UI button is "SaveDate" and the corresponding original document text containing the corresponding text "Pressing the <SaveDate> button results in the date of the transaction being stored in the database". Now, further consider, that the UI button is changed to "SaveDateAndTime". The engine may modify the document text by modifying <SaveDate> to <SaveDateAndTime> such that the corresponding text is "Pressing the <SaveDateAndTime> button results in the date of the transaction being stored in the database". However, further text may be needed. The engine highlights the change and indicates that the user may want to manually add something to the document text. In this example the user adds "and time of day" to the text to render "Pressing the <SaveDateAndTime> button results in the date and time of day of the transaction being stored in the database". Referring to FIG. 3B, in order to construct smart image text element (STE) data 301 from screenshot, the screenshot is analyzed and a smart image is created and stored. Smart image generator generates STE data from the screen shots according to processing including:
- 301A is for identifying all GUI elements (buttons, menus, fields) using edge detection software and/or other element detection methods.
- 301B is for extracting the text attached to each GUI element using optical character recognition (OCR) software and/or other methods.
- 301C is for generating smart image text element (STE) data by combining the extracted text with a unique identifier for each GUI element.
- 301D is for appending a STE reference to the GUI screen capture to create a smart image. The STE data may then be stored in document validation repository with previous versions and other STE data.

Figure 3C:
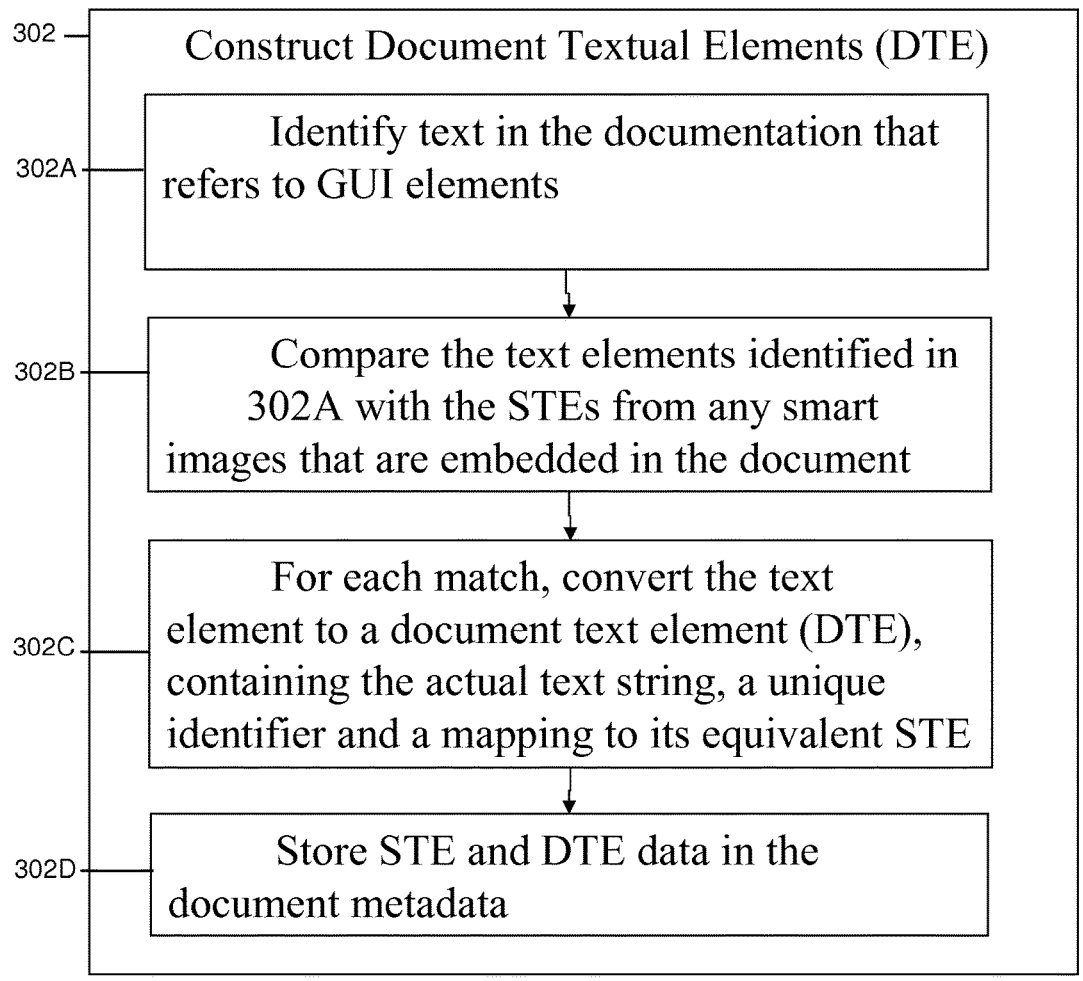

Referring to FIG. 3C, in order to construct document textual elements 302 the images and text are analyzed and compared with the STEs in order to find an initial match. This can be further manipulated/modified/clarified by an information engineer. Document textual element generator maps textual elements to the GUI screen capture elements to which they refer according to processing including:
- 302A is for identifying text in the documentation that refers to GUI elements. For instance, elements tagged as GUI elements such as <GUI-Control>.
- 302B is for comparing the text elements identified in 302A with the STEs from any smart images that are embedded in the document.
- 302C is for, for each match, converting the text element to a document text element (DTE), containing the actual text string, and a unique identifier and a mapping to its equivalent STE.
- 302D is for storing the STE and DTE in the document metadata.

Figure 3D:
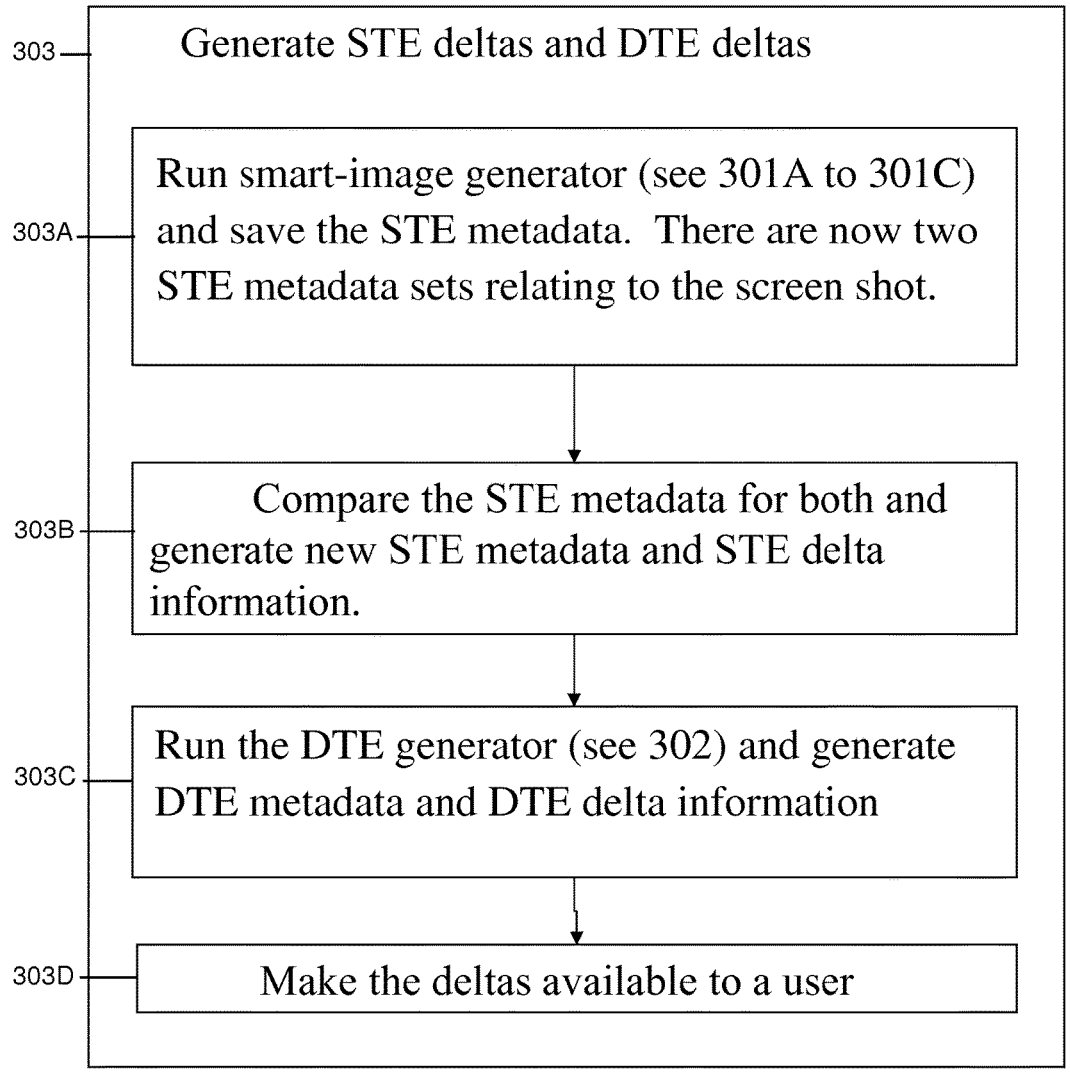

Referring to FIG. 3D, STE deltas and DTE deltas are generated 303 when updated versions of the software are produced and/or updated screen shots are produced. Screen shots may or may not be embedded in the document. The smart image generator 202 analyses the new screen shots and produces updated STEs and/or deltas to existing STEs to identify those screen captures in the document that have a delta, using processing including:
- 303A is for running the smart image generator (as described at 301A to 301C above) and saving the STE data. Two STE data sets relate to the same screen shot for different versions.
- 303B is for comparing the STE metadata for both and for generating new STE metadata and STE delta information.
- 303C is for running the DTE generator (as described in 302) and for generating DTE metadata and DTE delta information.
- 303D is for making the deltas available to a user.

Figure 4A:
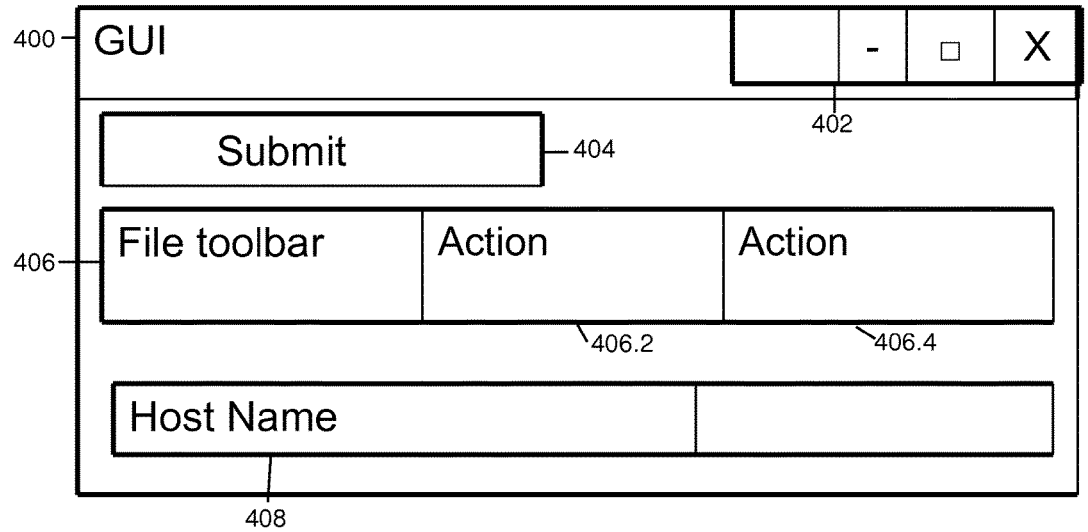
FIG. 4A is a schematic of an example existing graphical user interface (GUI)

FIG. 4A is an example existing graphical user interface (GUI) 400 screenshot. GUI 400 comprises: window control 402, submit button 404, file menu toolbar 406, and host name input field 408.

Window control 402 provides three buttons for respective minimizing; maximizing and closing of the GUI 400.

Submit button 404 is a control for submitting input data in a particular state.

File menu toolbar 406 provides two example controls: action 406.2, and action 406.4. Actions are, for example, for performing transforms on the host name input field and/or clear the host name input field.

Host name input field 408 provides a user input for the host name field. Characters may be input and entered using a keyboard.

Figure 4B:
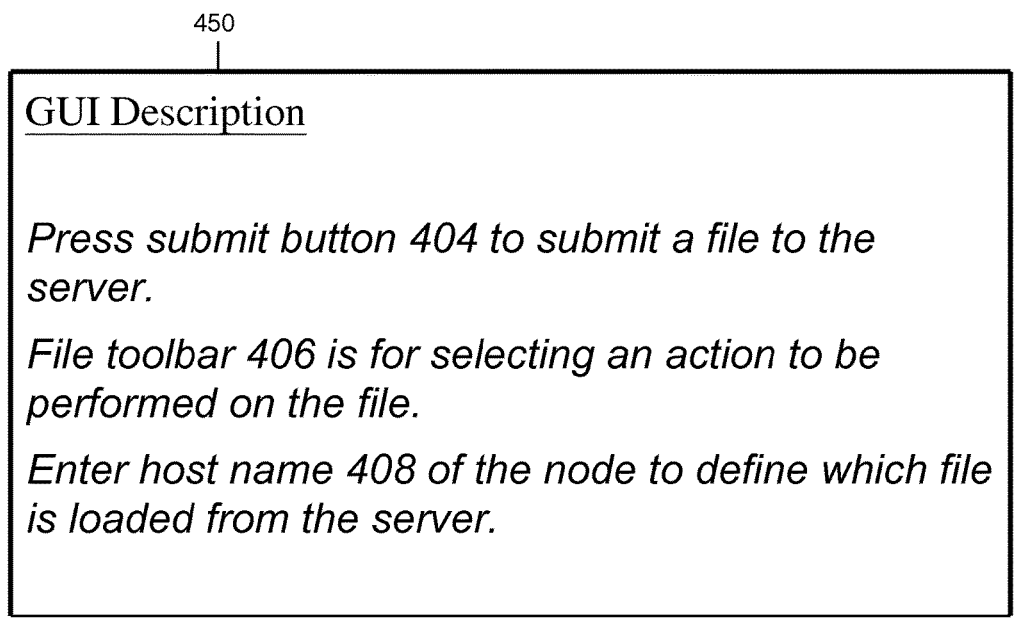
FIG. 4B is an example description for the existing GUI interface.

FIG. 4B is an example description 450 from a user publication of the existing GUI 400, the description 450 comprising the italic sentences below describing the interface elements of GUI 400. References numbers can be hidden from view as user configured. Press submit button 404 to submit a file to the server. File menu 406 is for selecting an action to be performed on the file. Enter host name 408 of the node to define which file is loaded from the server.

FIG. 4C is a schematic example of smart image textual element data 460 for the existing GUI, in accordance with aspects described herein. The columns of data 460 comprise: product name; STE_ID, type, label; and delta. Product name is the name of the application that is being analyzed, in this case the same application ATDv1 is being analyzed. STE_ID is the identifier of the smart image textual element. Type is the type of the smart image textual element. Label is a text label given to the STE. Thus, in this example, all of the smart image textual elements come from the same product, namely ATDv1. The smart image textual elements (image extracts from GUI 400) have been identified as three different types: an image with identified 420 is a type of button; an image with identifier 422 is a type of menu; and an image with identifier 424 is a type of field. There is no delta data at this stage in this example.

FIG. 4D is a schematic example of document textual element data 470 corresponding to the smart image textual element data 460, in accordance with aspects described herein. Initially the data may be entered manually so that document elements are associated with image elements. Therefore, in ATD user guide v1.0, occurrences of: "submit button" are associated with STE_ID 420; "file menu" are associated with STE_ID 422; and "host name" is associated with STE_ID 424.

Figure 5A:
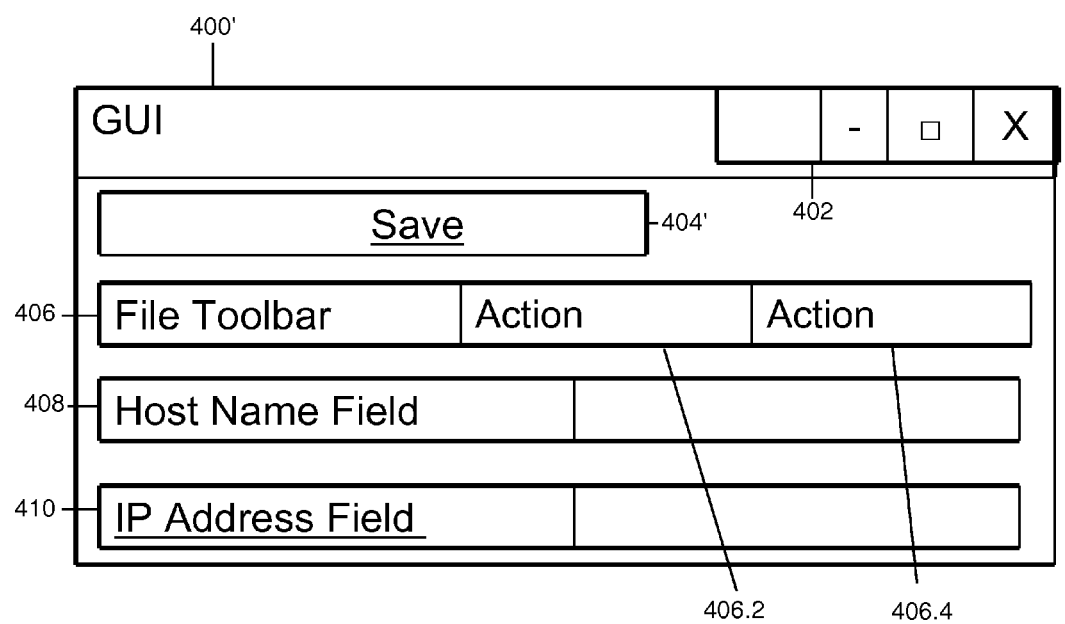
FIG. 5A is a schematic example of a modified GUI, in accordance with aspects described herein.

FIG. 5A is a schematic example of a modified example GUI 400', in accordance with aspects described herein. In this example the submit button 404 has been modified by changing the label from 'submit' to 'save' thereby becoming save button 404'. The text "Save" is underlined to indicate modification in the preferred embodiment and other mechanism can be used in other embodiments. File toolbar 406 is unmodified. Host name filed 408 is unmodified. IP address field 410 has been added and is underlined to indicate modification.

FIG. 5B is a schematic example of modified smart image textual element data 460' for a new GUI of FIG. 5A, in accordance with aspects described herein. New GUI 400' is scanned for image changes and STE data 460 is updated. STE_ID 420 is determined to have changed and a new label identified as "save"; STE_ID 420 is labeled with "save" and marked as modified in the delta column. STE_ID 422 is the same. STE_ID 424 is the same. STE_ID 426 has been added having a field type and with label of "IP address" is marked as NEW in the Delta column.

FIG. 5C is a schematic example diagram of modified document text element data 470', in accordance with aspects described herein. DTE data 470 is scanned to see if any of the modifications of STE data 460' apply and then modification are made to create DTE data 470'. For example, 'submit button' is modified to 'save button'. 'file toolbar' and 'host name' are unmodified. A new STE_ID record 426 is appended with text 'IP address' and marked as NEW in the Delta column.

Figure 5D:
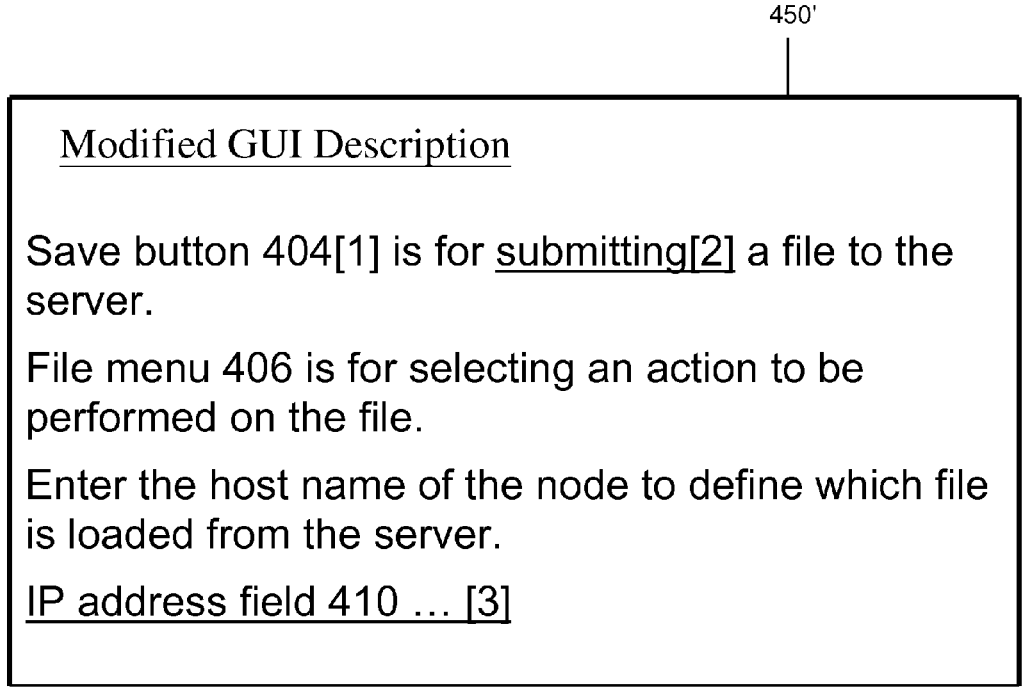
FIG. 5D is a schematic example of a modified description of the modified GUI, in accordance with aspects described herein.

FIG. 5D is a schematic example of a modified description 450' of modified GUI 400', in accordance with aspect described herein. Description 400 is scanned for modified DTEs using modified DTE data 470'. When a modified DTE is located then the document text is updated with the DTE text. 'submit button 404' text is updated to 'save button 404' and the text corresponding to the new addition is added to the document in the form 'IP address field 410 . . . ' such that an editor will understand that further explanatory text needs to be added manually. A further parse looks for a similar word to a pre-modified label that is proximate to that label; such words are then highlighted. For example; 'submitting' is identified and underlined as a similar word to a proximate label 'submit'. Notes [1], [2], [3] are added to the modified document whereby modifications are described for the user.

Figure 5E:
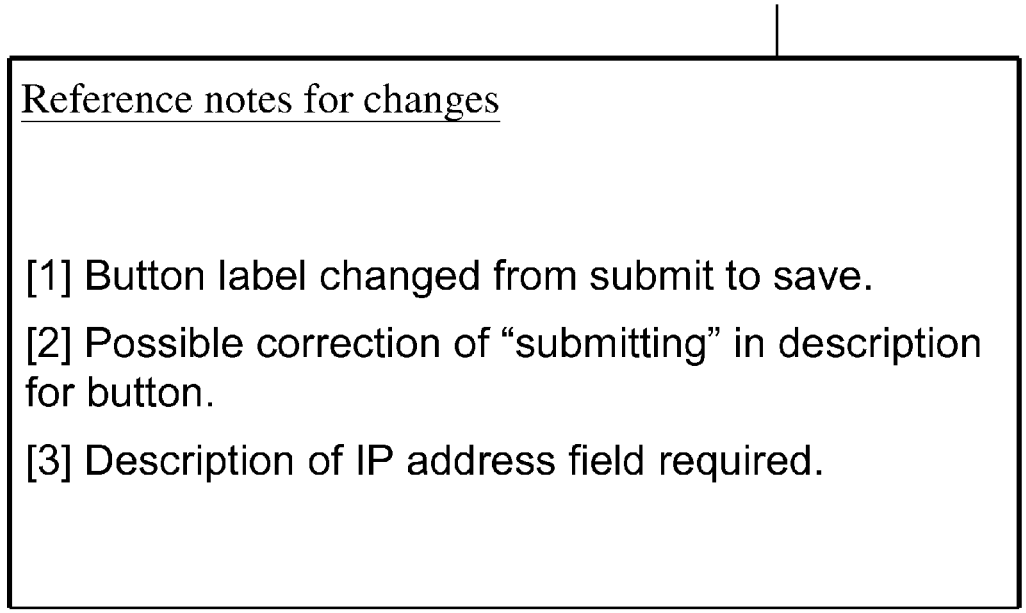
FIG. 5E is a list of actual or potential modifications to the modified description, in accordance with aspects described herein.

Referring to FIG. 5E, a list 490 of actual or potential modifications to modified description is shown, in accordance with aspects described herein. Note [1] describes that button label has been changed from 'submit' to 'save'. Note [2] describes that a possible further correction to the description for the button may be required, that is, changing submitting to saving or similar. Note [3] states that a description of an IP field is required.

In one aspect, there is provided a system for updating a document relating to a graphical user interface (GUI), the system comprising: a smart image generator for identifying one or more component images in a screenshot of an existing graphical user interface (GUI) and in a screenshot of a new GUI modified from the existing GUI; a character recognition engine for extracting image text associated with one or more component images from the existing GUI and the new GUI; a delta generator for identifying text and image differences between the component images and for identifying, in the document, document text associated with the text and image differences; and a document engine for modifying the associated document text according to the identified text and image differences.

The engine document engine is for presenting the text modifications and modified associated document text such that a user can further modify the documentation text or add new text if required. Documentation text is the explanatory text describing, for example, a 'Submit' button but not the associated image text 'Submit'. The engine may possibly modify the 'identifier' portion of the documentation text but not the documentation text itself.

Embodiment(s) of the invention provide a system that: computes and stores a smart image text element (STE) representing a contained GUI element text in a screenshot; and computes and stores a document text element (DTE) into the documentation system that includes a mapping to an associated STE.

Embodiments offer a smarter and more efficient method to ensure that the text in documents systems is aligned with the associated screenshots.

In another aspect, there is provided a method for updating a document relating to a graphical user interface (GUI), the method comprising: identifying one or more images in a screenshot of an existing graphical user interface (GUI) and in a screenshot of a new GUI modified from the existing GUI; extracting image text associated with one or more component images from the existing GUI and the new GUI; identifying, in the new GUI, text and image differences between the component images from the GUIs; identifying, in the document, document text associated with the text and image differences; and modifying the associated document text according to the identified text and image differences.

Modifying the new document comprises adding new image text where new image text is identified in the new GUI. The new document is modified by making the equivalent text modification when document text is the same as unmodified image text.

When document text is similar but not the same as the unmodified image text, the existing document may be modified with an indication of a potential manual modification. Such as modification is normally an indication or highlighting to the user that a modification is possible but needs manual confirmation. In the example, a similar word is underlined and referenced wherein the reference describes what manual consideration is necessary.

Each modification may be marked up to reference the modification and a description of the modifications.

A list of the modification descriptions may be made available.

The document may further comprise tags linking document text to image text.

At least one globally unique identifier of a user interface element may be embedded in the document to create an association with its related document text element. The embodiments may compare both image text and document text to produce a detailed comparison.

GUI images may be generated directly from a first and second version of application and stored as metadata in application documentation.

Suitably the component images may include but are not limited to a GUI button; a GUI menu; a GUI field and wherein such component images are identified by edge detection methods.

Embodiments can operate in version control systems or in document validation systems that operate below an overlying application level therefore demonstrating a technical effect operating at the system level of a computer. Embodiments may enable a version control system to update documents based on GUI images thereby operating in a new way and demonstrating another technical effect. Embodiments may reduce the number of errors found in a document update leading to an increase in the reliability of the document validation system and another technical effect.

In another aspect, there is provided a computer program product for updating a document relating to updates of a graphical user interface (GUI), the computer program product comprising a computer-readable storage medium having computer-readable program code embodied therewith and the computer-readable program code configured to perform all or some processing of methods and./or aspects thereof described herein.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In another aspect, there is provided a computer program stored on a computer readable medium and loadable into the internal memory of a computer, comprising software code portions, when the program is run on a computer, for performing all or some methods or aspects thereof described herein.

In another aspect, there is provided a data carrier aspect that comprises functional computer data structures to, when loaded into a computer system and operated upon thereby, enable the computer system to perform method or aspects thereof described herein. A suitable data-carrier could be a solid-state memory, magnetic drive or optical disk. Channels for the transmission of data may likewise comprise storage media of all descriptions as well as signal-carrying media, such as wired or wireless signal-carrying media.

Further embodiments of the invention are described. It will be clear to one of ordinary skill in the art that all or part of the processing may be alternatively embodied in a logic apparatus, or a plurality of logic apparatus, comprising logic elements arranged to perform processing a method and/or aspects thereof and that such logic elements may comprise hardware components, firmware components or a combination thereof.

It will be equally clear to one of skill in the art that all or part of the logic components may be alternatively embodied in logic apparatus comprising logic elements to perform processing of methods and/or aspects thereof described herein, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising deploying computer program code operable to, when deployed into a computer infrastructure and executed thereon, cause the computer system to perform processing of methods and/or aspects thereof described herein.

It will be appreciated that methods and components of embodiments may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Where transitory signals are not deemed patentable subject matter, a computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer system comprising:
a memory; and
a processing device in communication with the memory, wherein the computer system is configured to perform a method comprising:
identifying one or more component images in a screenshot of an existing graphical user interface (GUI) and in a screenshot of a new GUI modified from the existing GUI, the one or more component images each being an image of a respective GUI element of the existing GUI or the new GUI;
extracting image text associated with each component image of the one or more component images from the existing GUI and the new GUI, the image text associated with each component image being text appearing in the component image with the respective GUI element of which the component image is an image;

identifying, based on the one or more component images, one or more image text differences between the new GUI and the existing GUI, the one or more image text differences comprising one or more differences in text appearing within a GUI element of the new GUI as compared to the existing GUI, wherein the extracting recognizes alphanumeric characters forming the text appearing within the GUI element of the new GUI, and wherein the identifying the one or more image text differences comprises identifying that the alphanumeric characters forming the text appearing within the new GUI element differ from a text appearing within a corresponding GUI element of the existing GUI;

based on identifying the image text differences, identifying, in a document, document text associated with the identified image text differences; and modifying the document text according to the identified image text differences, the modifying comprising including in the document the alphanumeric characters forming the text appearing within the GUI element of the new GUI.

2. The computer system of claim 1, wherein the modifying comprises adding new image text where new image text is identified in the new GUI.

3. The computer system of claim 1, wherein the modifying makes an equivalent text modification when document text is the same as unmodified image text.

4. The computer system of claim 1, wherein, when document text is different from the unmodified image text, the modifying modifies with an indication of a potential manual modification.

5. The computer system of claim 1, wherein the modifying provides modifications, and wherein a modification of the modifications is marked up to reference the modification and a description of the modifications.

6. The computer system of claim 5, wherein a list of modification descriptions is made available.

7. The computer system of claim 1, wherein the document further comprises tags linking document text to image text.

8. The computer system of claim 1, wherein at least one globally unique identifier of a user interface element is embedded in the document to create an association with its related document text element.

9. The computer system of claim 1, wherein GUI images are generated directly from a first and second version of an application and stored as metadata in application documentation.

10. The computer system of claim 1, wherein the one or more component images include at least one selected from the group consisting of: (i) a GUI button, (ii) a GUI menu, and (iii) a GUI field, and wherein the one or more component images are identified by edge detection.

11. A computer-implemented method comprising:

identifying one or more component images in a screenshot of an existing graphical user interface (GUI) and in a screenshot of a new GUI modified from the existing GUI, the one or more component images each being an image of a respective GUI element of the existing GUI or the new GUI;

extracting image text associated with each component image of the one or more component images from the existing GUI and the new GUI, the image text associated with each component image being text appearing in the component image with the respective GUI element of which the component image is an image;

identifying, based on the one or more component images, one or more image text differences between the new GUI and the existing GUI, the one or more image text differences comprising one or more differences in text appearing within a GUI element of the new GUI as compared to the existing GUI, wherein the extracting recognizes alphanumeric characters forming the text appearing within the GUI element of the new GUI, and wherein the identifying the one or more image text differences comprises identifying that the alphanumeric characters forming the text appearing within the new GUI element differ from a text appearing within a corresponding GUI element of the existing GUI;

based on identifying the image text differences, identifying, in a document, document text associated with the identified image text differences; and modifying the document text according to the identified image text differences, the modifying comprising including in the document the alphanumeric characters forming the text appearing within the GUI element of the new GUI.

12. The method of claim 11, wherein the modifying comprises adding new image text where new image text is identified in the new GUI.

13. The method of claim 11, wherein the modifying makes an equivalent text modification when document text is the same as unmodified image text.

14. The method of claim 11, wherein, when document text is different from the unmodified image text, the modifying modifies with an indication of a potential manual modification.

15. The method of claim 11, wherein the modifying provides modifications, and wherein a modification of the modifications is marked up to reference the modification and a description of the modifications.

16. The method of claim 15, wherein a list of modification descriptions is made available.

17. The method of claim 11, wherein the document further comprises tags linking document text to image text.

18. The method of claim 11, wherein at least one globally unique identifier of a user interface element is embedded in the document to create an association with its related document text element.

19. A computer program product comprising:

a computer readable storage medium readable by a processing circuit and storing instructions for execution by the processing circuit for performing a method comprising:

identifying one or more component images in a screenshot of an existing graphical user interface (GUI) and in a screenshot of a new GUI modified from the existing GUI, the one or more component images each being an image of a respective GUI element of the existing GUI or the new GUI;

extracting image text associated with each component image of the one or more component images from the existing GUI and the new GUI, the image text associated with each component image being text appearing in the component image with the respective GUI element of which the component image is an image;

identifying, based on the one or more component images, one or more image text differences between the new GUI and the existing GUI, the one or more image text differences comprising one or more differences in text appearing within a GUI element of the new GUI as compared to the existing GUI, wherein the extracting recognizes alphanumeric characters forming the text appearing within the GUI element of the new GUI, and wherein the identifying the one or more image text differences comprises identifying that the alphanumeric characters forming the text appearing within the new GUI element differ from a text appearing within a corresponding GUI element of the existing GUI;

based on identifying the image text differences, identifying, in a document, document text associated with the identified image text differences; and modifying the document text according to the identified image text differences, the modifying comprising including in the document the alphanumeric characters forming the text appearing within the GUI element of the new GUI.

20. The computer program product claim 19, wherein the modifying comprises adding new image text where new image text is identified in the new GUI.

\* \* \* \* \*